United States Patent
Chun

(10) Patent No.: US 9,762,703 B2
(45) Date of Patent: Sep. 12, 2017

(54) METHOD AND APPARATUS FOR ASSEMBLING DATA, AND RESOURCE PROPAGATION SYSTEM

(71) Applicant: Shenzhen Development Promotion Centre For Enterprises, Shenzhen (CN)

(72) Inventor: Jimmy Chun, Shenzhen (CN)

(73) Assignee: SHENZHEN DEVELOPMENT PROMOTION CENTRE FOR ENTERPRISES, Shenzhen, Guangdong (CN)

(*) Notice: Subject to any disclaimer, the term of this patent is extended or adjusted under 35 U.S.C. 154(b) by 207 days.

(21) Appl. No.: 14/452,297

(22) Filed: Aug. 5, 2014

(65) Prior Publication Data
US 2015/0304460 A1    Oct. 22, 2015

(30) Foreign Application Priority Data
Apr. 22, 2014    (CN) .......................... 2014 1 0164252

(51) Int. Cl.
G06F 15/16 (2006.01)
H04L 29/06 (2006.01)
G06Q 30/02 (2012.01)
H04L 29/08 (2006.01)

(52) U.S. Cl.
CPC ....... *H04L 69/166* (2013.01); *G06Q 30/0277* (2013.01); *H04L 67/02* (2013.01); *H04L 67/42* (2013.01)

(58) Field of Classification Search
CPC ................. H04L 27/2657; H04L 5/001; H04L 2027/0065
See application file for complete search history.

(56) References Cited

U.S. PATENT DOCUMENTS

| | | | |
|---|---|---|---|
| 8,495,675 B1* | 7/2013 | Philpott | H04H 20/103 725/105 |
| 2003/0191816 A1* | 10/2003 | Landress | G06Q 30/02 709/219 |
| 2005/0144073 A1* | 6/2005 | Morrisroe | G06Q 30/02 705/14.5 |
| 2007/0078712 A1* | 4/2007 | Ott | G06Q 30/02 705/14.69 |
| 2009/0005010 A1* | 1/2009 | Dote | H04L 12/585 455/412.1 |

(Continued)

*Primary Examiner* — Aftab N. Khan
(74) *Attorney, Agent, or Firm* — Leason Ellis LLP

(57) ABSTRACT

A method and apparatus for assembling data, and a resource propagation system. The method comprises: acquiring content, and generating a content data packet; generating an identifier of a container; combining the content data packet and the identifier into a container data packet capable of encapsulating value-added content information; and generating a resource address comprising the identifier; wherein the container is structured data. The content and the value-added content information are encapsulated via a container, which implements decoupling between the content and the value-added content information, implements simple and convenient replacement of the value-added content information, reduces replacement cost of the value-added content information, such as, advertisement content data, and better matches the content with the value-added content information.

16 Claims, 4 Drawing Sheets

(56) References Cited

U.S. PATENT DOCUMENTS

2009/0063280 A1\* 3/2009 Wurster ................. G06Q 30/02
　　　　　　　　　　　　　　　　　　　　　　705/14.73
2015/0269629 A1\* 9/2015 Lo ...................... G06Q 30/0269
　　　　　　　　　　　　　　　　　　　　　　705/14.66

\* cited by examiner

METHOD AND APPARATUS FOR ASSEMBLING DATA, AND RESOURCE PROPAGATION SYSTEM This application is based on Chinese Patent Application No. 201410164252.8 filed with the Chinese Patent Office on Apr. 22, 2014, the entire content of which is hereby incorporated by reference.

FIELD OF THE INVENTION

The present invention relates to the Internet field, and particularly, to a method and apparatus for assembling data, and a resource propagation system.

BACKGROUND OF THE INVENTION

At present, during a content propagation process, it is commonplace in Internet advertisement deployment, to release such value-added content information as advertisement. Generally, space for releasing advertisement is predefined during the content layout phase, and then the advertisement is dynamically acquired from an advertisement alliance platform, and displayed. The advertisement alliance platform provides an advertisement acquisition interface and an advertisement self-release management platform, and constructs an advertisement resource pool. A website or a client for content display dynamically calls the advertisement acquisition interface to acquires advertisement content, and displays the acquired advertisement content on the predefined space for releasing advertisement.

In such a manner of acquiring advertisement by using uniform space for releasing advertisement, expression of the advertisement is monotonous, and after the advertisement is released to a content website or a client, advertisement content cannot be replaced any time as the advertiser requires, and the operations for advertisement content replacement are complicated and replacement costs are high.

SUMMARY OF THE INVENTION

Embodiments of the present invention provide a method for assembling data, which is directed to solving the problem of how to simply and conveniently change value-added content information in content, such as, advertisement content data.

An embodiment of the present invention provides a method for assembling data. The method comprises:
  acquiring content, and generating a content data packet;
  generating an identifier of a container;
  combining the content data packet and the identifier into a container data packet capable of encapsulating value-added content information; and
  generating a resource address comprising the identifier;
  wherein the container is structured data.

An embodiment of the present invention provides an apparatus for assembling data. The apparatus comprises:
  a content data packet generating unit, configured to acquire content, and generate a content data packet;
  a container identifier generating unit, configured to generate an identifier of a container;
  a container data packet generating unit, configured to combine the content data packet and the identifier into a container data packet capable of encapsulating value-added content information; and
  a resource address generating unit, configured to generate a resource address comprising the identifier;
  wherein the container is structured data.

An embodiment of the present invention provides a resource propagation system. The system comprises an apparatus for assembling data.

The apparatus for assembling data comprises:
  a content data packet generating unit, configured to acquire content, and generate a content data packet;
  a container identifier generating unit, configured to generate an identifier of a container;
  a container data packet generating unit, configured to combine the content data packet and the identifier into a container data packet capable of encapsulating value-added content information; and
  a resource address generating unit, configured to generate a resource address comprising the identifier;
  wherein the container is structured data.

According to the embodiments of the present invention, the content and the value-added content information are encapsulated via a container, which implements decoupling between the content and the value-added content information, implements simple and convenient replacement of the value-added content information, reduces replacement cost of the value-added content information, such as, advertisement content data, and better matches the content with the value-added content information.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

To make the objectives, technical solutions, and advantages of the present invention clearer, the present invention is further described in detail in combination with specific embodiments and attached drawings. It should be understood that the embodiments described herein are only exemplary ones for illustrating the present invention, and are not intended to limit the present invention.

According to the embodiments of the present invention, such value-added content information as advertisement content data is encapsulated via a container, and thereby the decoupling between content and the value-added content information is achieved.

In the embodiments of the present invention, the container is structured data, and each container is assigned an identifier (ID).

As an embodiment of the present invention, the container may be stored as a file or a database.

Using a scenario where the container is stored as a file as an example, the container ID may be used as the file name and the container may be stored in XML format.

For example, file 123456.xml with container ID 123456 may be expressed as follows:

```
<container id="123456"><content type="video">
http://example.com/video/abc
</content></container>
```

Using a scenario where the container is stored as a database as an example, a container table may be created in a relational database. For example:

The table fields are (id, type, content, ad), and a row of data (123456, "movie", content data packet, null) is written. The container table which is used to store a container data packet refers to a table created in a database. In the table filed, "id" is the container ID, "type" is the content type, "content" is the content data packet, and "ad" is the filed of the value-added content information. The filed of the value-added content information may comprise a resource address and a presence parameter of the value-added content information. When initial content is imported, the filed of the value-added content information is an empty string.

In the embodiments of the present invention, when the content is acquired via the resource address, the content data packet comprises resource address, content name, content type, and content attribute. When the content is acquired by uploading a file, the content data packet comprises a resource address of the file.

In the embodiments of the present invention, the value-added content information may be payment prompt information of the content or advertisement content data.

Figure 1:
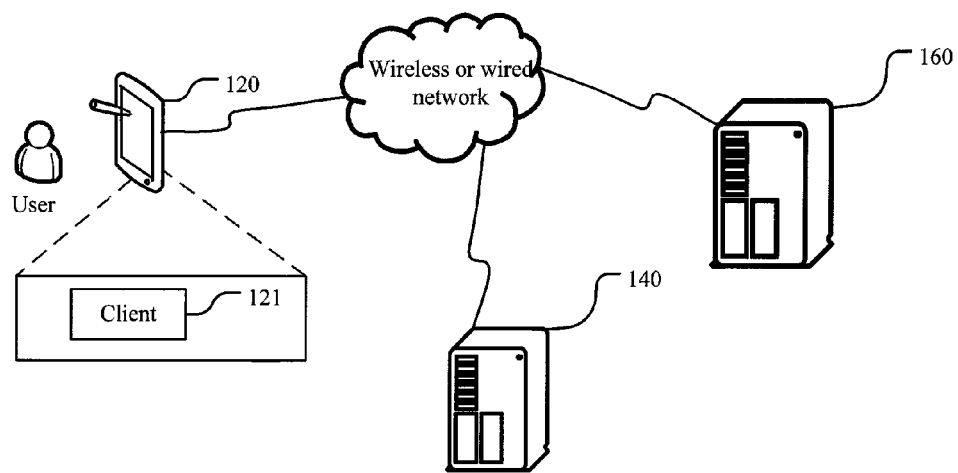
FIG. 1 is a schematic structural view of an implementation environment of a method for assembling data according to an embodiment of the present invention.

FIG. 1 illustrates an implementation environment of a method for assembly data according to an embodiment of the present invention. The implementation environment comprises a plurality of clients 121 running on a terminal device 120, a value-added content information server 140, and a resource propagation server 160.

The clients 121 run on the terminal device 120 of a user, and may be provided by a content service provider, for example, a browser client, a forum client, an email client, a Weibo (microblog) client, or an entertainment client, an online audio player client, an online video player client, and the like.

The terminal device 120 may be a personal computer, a smart television, a smart phone, a tablet computer, an electronic book reader, a Moving Picture Experts Group Audio Layer III (MP3) player, a Moving Picture Experts Group Audio Layer IV (MP4) player, a TV, a laptop computer, a desktop computer, and the like.

The value-added content information server 140 stores value-added content information for the clients 121 to download or play, and provides the value-added content information for the user. The value-added content information may be payment prompt information of the content or advertisement content data.

The resource propagation server 160 stores resource addresses of value-added content information stored on the value-added content information server 140, and may communicate with the clients 121 over a wired network or a wireless network. A user acquires the resource address of the value-added content information from the resource propagation server 160 via the clients 121, acquires corresponding value-added content information from the value-added content information server 140 via the resource address, and then browses, downloads or plays the value-added content information.

Figure 2:
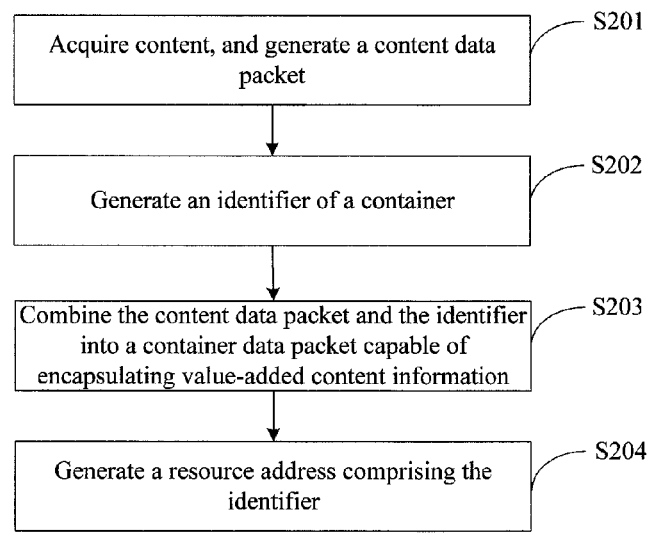
FIG. 2 is a flowchart of a method for assembling data according to an embodiment of the present invention.

FIG. 2 is a flowchart of a method for assembling data according to an embodiment of the present invention.

In step S201, content is acquired, and a content data packet is generated.

In the embodiments of the present invention, the content may be audios, videos, texts, pictures, or the like. The content may be acquired via resource addressor or by uploading a file.

When the content is acquired by uploading a file, the file needs to be stored in a resource propagation sever first, and then a resource address of the file is generated.

As an embodiment of the present invention, the content data packet comprises resource address, content name, content type, and content attribute. The content type may be videos, audios, pictures, texts, and the like; and the content attribute may be directors and actors and actresses in movies, or composers and singers of songs, or the like.

In step S202, an identifier of a container is generated.

In the embodiments of the present invention, the container is a segment of structured data.

As an embodiment of the present invention, the container may be stored as a file, or a database, or the like.

In step S203, the content data packet and the container identifier are combined into a container data packet capable of encapsulating value-added content information.

In the embodiments of the present invention, the content data packet and the container ID are combined into the container data packet, and the value-added content information may be encapsulated into the container data packet.

As a preferred embodiment of the present invention, the value-added content information may be payment prompt information of the content or advertisement content data.

As an embodiment of the present invention, the value-added content information may be encapsulated into the container data packet before or after the content propagation.

In step S204, a resource address comprising the container identifier is generated.

In the embodiments of the present invention, since the resource address comprises the container ID, upon receiving a request for opening the resource address, the resource propagation server may acquire the content and the value-added content information by query via the container ID.

The resource address may be a uniform resource locator (URL). The URL is a brief expression of a location where a resource can be acquired and an access method therefor, and is a resource address of a standard resource over the Internet. Each resource on the Internet is assigned a unique URL, which comprises information specifying the location of the resource and how a related application program, for example, a browser processes the resource, and has been formulated in the Internet standards RFC 1738 by the World Wide Web Consortium.

According to the embodiments of the present invention, by acquiring content, and generating a content data packet, generating an identifier of a container, combining the content data packet and the container identifier into a container data packet capable of encapsulating value-added content information, and generating a resource address comprising the container identifier, value-added content information may be conveniently encapsulated into content as required.

The embodiments of the present invention use a scenario where the value-added content information is the advertisement content data as an example for further description.

In the embodiments of the present invention, advertisement may be released in two manners:

The resource address of a fusion file generated by importing advertisement content data into the content is used to replace the resource address of the content in an original content data packet, which is referred to as embedded advertisement.

After content propagation, the resource address of the advertisement content data and the presence parameter are written into the container data packet, which is referred to as associated advertisement.

These two advertisement release manners do not change the resource address, and may be used at the same time. A specific advertisement release manner may be selected according to the specific scenario and service logic.

Figure 3:
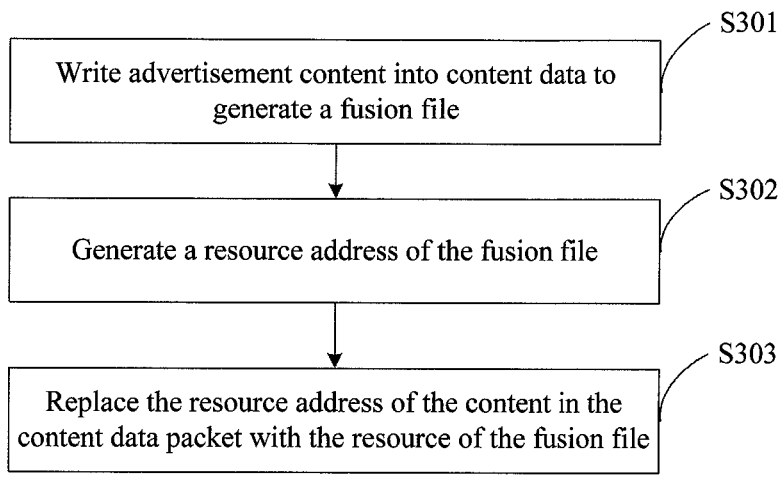
FIG. 3 is a flowchart of encapsulating value-added content information into a container data packet according to an embodiment of the present invention.

In an embodiment of the present invention, the embedded advertisement release manner is selected. The advertisement content data is encapsulated into the container data packet, as illustrated in FIG. 3.

In step S301, the advertisement content data is imported into the content to generate a fusion file.

As an embodiment of the present invention, an advertiser uploads the advertisement content to a value-added content information server over a wired network or a wireless network; and the value-added content information server stores the advertisement content, and generates the resource address of the advertisement content. When a content propagator imports content into the resource propagation server, the content may be segmented as required, and resource addresses of the segments of content are generated. The advertisement content data is imported into the content, and according to the requirement of the advertiser, the resource address of the advertisement content and the resource addresses of the content segments are combined into a new play list. The play list is the fusion file generated by importing the advertisement content data into the content.

In step S302, a resource address of the fusion file is generated.

In step S303, the resource address in the content data packet is replaced with the resource address of the fusion file.

Using a scenario where a video (http://example.com/video/abc) is imported into content and embedded advertisement is released as an example, the process may be specifically as follows:

A. Acquiring content corresponding to resource address http://example.com/video/abc, and generating a content data packet.

The content data packet is: {url:±http://example.com/video/abc",type:"video",title:"video name",info:{sharer:"uploader"},desc:"video introduction"}.

B. Generating a container Id. In the embodiments of the present invention, an automatic increment container ID is employed, for example, ID=123456.

C. Combining the content data packet and the container ID into a container data packet.

In the embodiments of the present invention, if the container is stored as a database, the container data packet is:

(123456,"movie",{url:"http://example.com/video/abc", type:"video",title:"video name",info:{sharer:"uploader"}, desc:"video introduction"},null).

In this case, the "ad" field is an empty string.

If the container is stored as a file, the container data packet is:

```
<?xml version="1.0" encoding="UTF-8"?>
<container id="123456">
 <content type="video">
  <url>http://example.com/video/abc</url>
  <title>video name</title>
  <info>
   <sharer>uploader</sharer>
   <desc>video introduction</desc>
  </info>
 </content>
 <ad></ad>
</container>
```

D. Generating resource address http://example.com/container/123456 comprising the container ID.

E. Importing a video, and segmenting the video file.

The video file may be segmented by using any one of the conventional segmentation methods. It is assumed that the video file is segmented into totally 10 segments, each with a duration of 30 seconds. The resource address of the $i^{th}$ segment is http://example.com/video/abc/seg_i, where i=1, 2, . . . , 10. If one piece of head advertisement needs to be released, the resource address of which is http://example.com/ad/video/xxx, one piece of tail advertisement needs to be released, the resource address of which is http://example.com/ad/video/xyz, and one piece of advertisement needs to be released after the fifth segment, the resource address of which is http://example.com/ad/video/opq, then the data of the play list is as follows:

```
http://example.com/ad/video/xxx
http://example.com/video/abc/seg_1
...
http://example.com/video/abc/seg_5
http://example.com/ad/video/opq
http://example.com/video/abc/seg_6
...
http://example.com/video/abc/seg_10
http://example.com/ad/video/xyz
```

F. In the embodiments of the present invention, writing the assembled data into the resource propagation server in a format of the play list, and generating resource address http://example.com/playlist/abc for the assembled data.

G. Updating the data of the database container table, and replacing the resource address of the original content with the resource address, inserted with the resource address, of the play list.

Specifically, http://example.com/playlist/abc is used to replace http://example.com/video/abc.

In this case, if the container is stored as a database, the container data packet is:

(123456, "movie", {url:"http://example.com/playlist/abc",type:"video",title:"video name",info:{sharer:"uploader"},desc:"video introduction"},null).

If the container is stored as a file, the container data packet is:

```
<?xml version="1.0" encoding="UTF-8"?>
<container id="123456">
 <content type="video">
  <url>http://example.com/playlist/abc</url>
  <title>video name</title>
  <info>
   <sharer>uploader</sharer>
   <desc>video introduction</desc>
  </info>
 </content>
 <ad></ad>
</container>
```

In the embodiments of the present invention, the video content employs m3u8 as a play list format.

Figure 4:
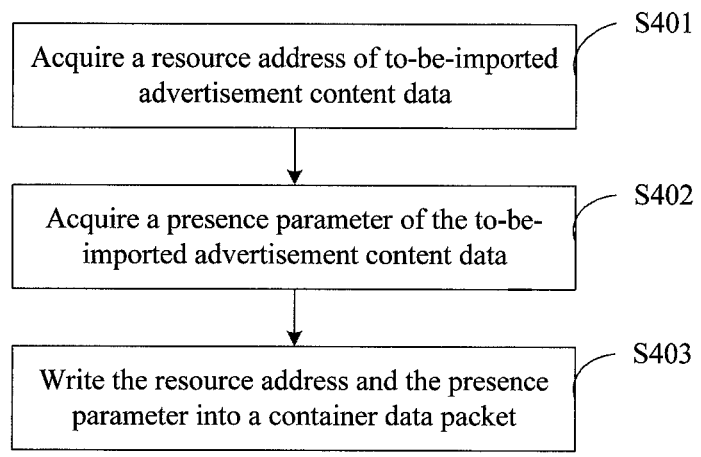
FIG. 4 is a flowchart of encapsulating value-added content information into a container data packet according to another embodiment of the present invention.

In an embodiment of the present invention, the associated advertisement release manner is selected. The advertisement content data is encapsulated into the container data packet, as illustrated in FIG. 4.

In step S401, a resource address of advertisement content data to be imported is acquired.

In step S402, a presence parameter of the advertisement content data to be imported is acquired.

In the embodiments of the present invention, the presence parameter of the advertisement may be playing pre-advertisement, playing the on-pause advertisement, playing floating advertisement, clicking to trigger advertisement, playing embedded advertisement, and the like.

In step S403, the acquired resource address and the presence parameter are written into the container data packet.

Using a scenario where a video (http://example.com/video/abc) is imported into a container data packet and associated advertisement is released as an example, the process may be specifically as follows:

A. Acquiring content corresponding to resource address http://example.com/video/abc.

The content data packet is: {url:"http://example.com/video/abc",type:"video",title:"video name",info:{sharer:"uploader"},desc:"video introduction"}.

B. Generating a container ID. In the embodiments of the present invention, an automatic increment container ID is employed, for example, ID=123456.

C. Combining the content data packet and the container ID into a container data packet.

In the embodiments of the present invention, if the container is stored as a database, the container data packet is: (123456,"movie", {url:"http://example.com/video/abc", type:"video",title:"video name",info:{sharer:"uploader"}, desc:"video introduction"},null). In this case, no associated advertisement data is imported, the "ad" field is an empty string.

If the container is stored as a file, the container data packet is:

```
<?xml version="1.0" encoding="UTF-8"?>
<container id="123456">
  <content type="video">
    <url>http://example.com/video/abc</url>
    <title>video name</title>
    <info>
      <sharer>uploader</sharer>
      <desc>video introduction</desc>
    </info>
  </content>
  <ad></ad>
</container>
```

D. Generating resource address http://example.com/container/123456 comprising the container ID.

E. Acquiring the resource address of the advertisement content data.

F. Acquiring the presence parameter of the advertisement content data.

G. Writing the resource address and the presence parameter into the container data packet.

If pre-advertisement is to be released, the data in the container data packet is updated. The data of the "ad" field recorded in "id=123456" is updated to:

{url:"http://example.com/ad/video/xxx",policy:"beforePlay"}, or

<item event="beforePlay">http://example.com/ad/video/xxx</item>.

The field data indicates that the advertisement video http://example.com/ad/video/xxx is played before the video is played.

In this case, if the container is stored as a database, the container data packet is:

(123456,"movie",{url:"http://example.com/video/abc", type:"video",title:"video name",info:{sharer:"uploader"}, desc:"video description"},{url:"http://example.com/ad/video/xxx",policy:"beforePlay"}).

If the container is stored as a file, the container data packet is:

```
<?xml version="1.0" encoding="UTF-8"?>
<container id="123456">
  <content type="video">
    <url>http://example.com/video/abc</url>
    <title>video name</title>
    <info>
      <sharer>uploader</sharer>
      <desc>video introduction</desc>
    </info>
  </content>
  <ad>
    <item event="beforePlay">http://example.com/ad/video/xxx</item>
  </ad>
</container>
```

If pre-advertisement needs to be released and picture advertisement needs to be triggered between pauses during playing of the video, the data of the "ad" field should be stored as:

[{url:"http://example.com/ad/video/xxx",policy:"beforePlay"},{url:"http://example.com/ad/pic/xxx",policy:"onPause"}], or <item event="beforePlay">http://example.com/ad/video/xxx</item>
<item event="onPause">http://example.com/ad/pic/xxx</item>.

The field data indicates that advertisement video http://example.com/ad/video/xxx is played before the video is played and advertisement picture http://example.com/ad/pic/xxx is played after the playing of the video is paused.

In this case, if the container is stored as a database, the container data packet is:

(123456,"movie",{url:"http://example.com/video/abc", type:"video",title:"vide name",info:{sharer:"uploader"}, desc:"vide introduction"}, [{url:"http://example.com/ad/video/xxx",policy:"beforePlay"},{url:"http://example.com/ad/pic/xxx",policy:"onPause"}]).

If the container is stored as a file, the container data packet is:

```
<?xml version="1.0" encoding="UTF-8"?>
<container id="123456">
  <content type="video">
    <url>http://example.com/video/abc</url>
    <title>video name</title>
    <info>
      <sharer>uploader</sharer>
      <desc>video introduction</desc>
    </info>
  </content>
  <ad>
    <item event="beforePlay">http://example.com/ad/video/xxx</item>
```

```
      <item   event="onPause">http://example.com/ad/pic/xxx</item>
    </ad>
  </container>
```

If the pre-advertisement needs to be deleted, the data of the "ad" field recorded in "id=123456" is modified to:

{url:"http://example.com/ad/pic/xxx",policy:"onPause"}, or

<item   event="onPause">http://example.com/ad/pic/xxx</item>.

The field data indicates that advertisement picture http://example.com/ad/pic/xxx is played before the playing of the video is paused.

In this case, if the container is stored as a database, the container data packet is:

(123456,"movie",{url:"http://example.com/video/abc", type:"video",title:"video name",info:{sharer:"uploader"}, desc:"video introduction"},{url:"http://example.com/ad/pic/xxx", policy:"onPause"}).

If the container is stored as a file, the container data packet is:

```
<?xml version="1.0" encoding="UTF-8"?>
  <container id="123456">
    <content type="video">
      <url>http://example.com/video/abc</url>
      <title>video name</title>
      <info>
         <sharer>uploader</sharer>
         <desc>video introduction</desc>
      </info>
    </content>
    <ad>
      <item  event="onPause">http://example.com/ad/pic/xxx</item>
    </ad>
  </container>
```

In the embodiments of the present invention, the advertisement is released in a manner of associated advertisement, and when the resource address is opened on the client, the resource propagation server needs to lay out the content on the webpage. Since the resource address comprises the container ID, upon receiving a request for opening the resource address, the resource propagation server may acquire the content and the advertisement content data by query via the container ID. According to the embodiments of the present invention, the layout on the webpage refers to a process of converting the original content and advertisement content data into an HTML standard language. After the layout on the webpage, the data returned from the resource address is an HTML file, and a universal browser may implement the webpage presentation. After the layout on the webpage, the client presents the advertisement and the content according to an advertisement presence parameter.

The method for assembling data according to the embodiments of the present invention is capable of conveniently modifying the assembled data; and is not only capable of conveniently adding the value-added content information into the content, but also conveniently deleting the added value-added content information from the content or replacing the added value-added content information with other value-added content information.

With the method for assembling data, the content and the value-added content information may be conveniently assembled, and the added value-added information may be changed and updated as required. In the embodiments of the present invention, the advertisement content of the released advertisement may be somewhat associated with the content, or may be not associated with the content. Preferably, the advertisement closely associated with the content may be selected for advertisement release. To be specific, with the method for assembling data according to the embodiments of the present invention, the advertiser may actively select content for advertisement release, so as to select proper advertisement for each piece of content. In this way, association between the content and the advertisement is enhanced, and the effect of advertisement release is improved.

Further, using storing the container as a database as an example, a video (http://example.com/video/abc) is imported into the container data packet, and embedded advertisement and associated advertisement are simultaneously released. The process is specifically as follows:

When a video (http://example.com/video/xyz) is imported into the resource propagation server, the video file is segmented, wherein the video file may be segmented by using any one of the conventional segmentation methods. It is assumed that the video file is partitioned into two segments. The resource address of the $i^{th}$ segment is http://example.com/video/abc/seg_i, where i=1, 2. If one piece of advertisement needs to be released after the first segment, and the resource address is http://example.com/ad/video/opq, then the data of the play list is as follows:

http://example.com/video/xyz/seg_1
http://example.com/ad/video/opq
http://example.com/video/xyz/seg_2

Resource address http://example.com/playlist/xyz is generated for the data of the play list.

The resource address of the original content is replaced by the generated resource address. Specifically, http://example.com/playlist/xyz is used to replace http://example.com/video/xyz.

If the pre-advertisement is to be released after the video is played, the data in the container data packet is updated. The data of the "ad" field is updated to: {url:"http://example.com/ad/video/xxx",policy:"beforePlay"}.

In this case, the container data packet is:

(123456, "movie", {url:"http://example.com/playlist/xyz", type:"video",title:"vedio name",info:{sharer:"uploader"},desc:"video introduction"},{url:"http://example.com/ad/video/xxx",policy:"beforePlay"}).

With the above process for assembling data, the advertisement data may be encapsulated into the container data packet before the content propagation, or may be encapsulated into the container data packet after the content propagation. These two manners coexist. A specific advertisement release manner may be determined according to the requirement of the advertiser, and the specific scenario and service logic.

Figure 5:
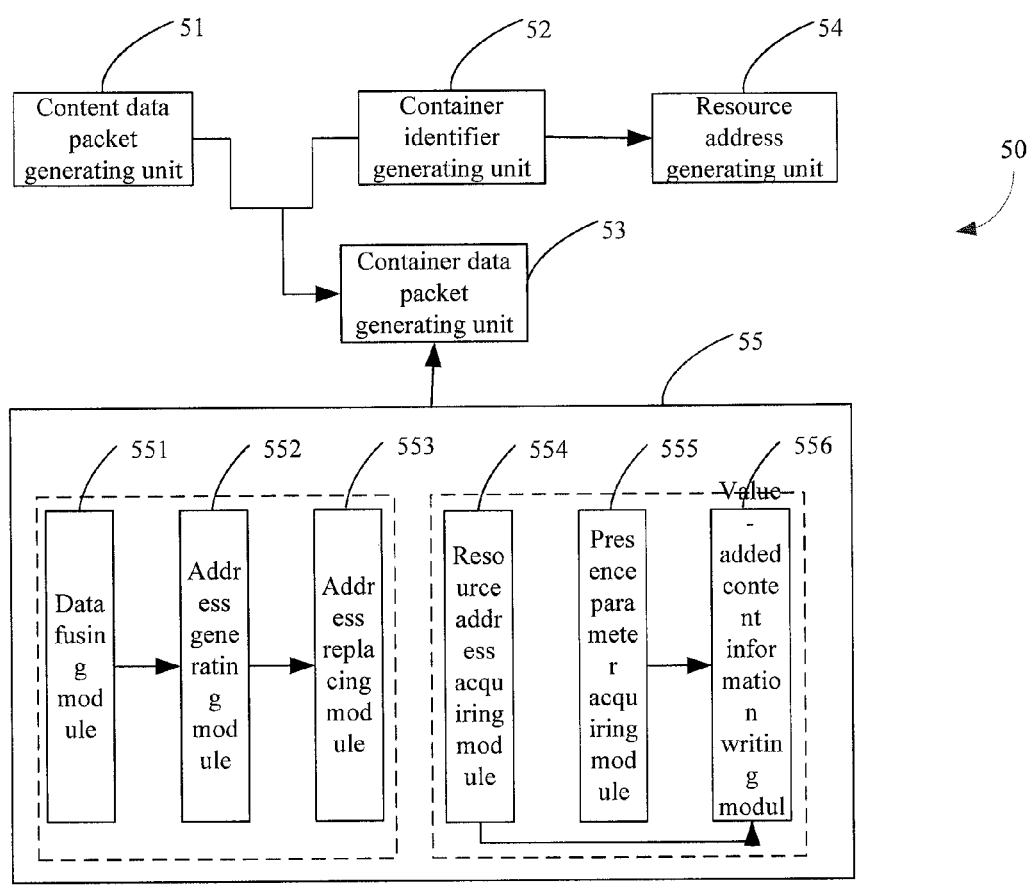
FIG. 5 is a schematic structural view of an apparatus for assembling data according to an embodiment of the present invention.

FIG. 5 illustrates a structure of an apparatus for assembling data according to an embodiment of the present invention. For ease of description, parts relevant to the embodiments of the present invention are only illustrated.

The apparatus 50 for assembling data may be integrated or applied in a resource propagation system. The resource propagation system may be an instant messaging tool, or such a social networking website as web blog and Weibo, a forum, a news releasing system, a multimedia releasing system for video or music releasing, various content releasing APPs, and an application system and the like.

The resource propagation system is configured on one or a plurality of resource propagation servers 160, and assembles content together with content and value-added content information on the resource propagation servers 160 via a container, thereby implementing decoupling between the content and the value-added content information, and propagating the resource address to the Internet. The plurality of resource propagation servers 160 are connected to each other over the Internet and are connected to the Internet.

During the data assembling process of the resource propagation system, the apparatus 50 for assembling data, by acquiring content, and generating a content data packet, generating an identifier of a container, combining the content data packet and the container identifier into a container data packet capable of encapsulating value-added content information, and generating a resource address comprising the container identifier, may achieve convenient encapsulation of value-added content information encapsulated into content as required.

In the embodiments of the present invention, the apparatus for assembling data comprises a content data packet generating unit 51, a container identifier generating unit 52, a container data packet generating unit 53, and a resource address generating unit 54.

The content data packet generating unit 51 is configured to acquire content, and generate a content data packet.

In the embodiments of the present invention, the content may be audios, videos, texts, pictures, or the like. The content may be acquired via resource address or by uploading a file.

When the content is acquired by uploading a file, the file needs to be stored in a resource propagation system first, and then a resource address of the file is generated.

As an embodiment of the present invention, the content data packet comprises resource address, content name, content type, and content attribute. The content type may be videos, audios, pictures, texts, and the like; and the content attribute may be directors and actors and actresses in movies, or composers and singers of songs, or the like.

The container identifier generating unit 52 is configured to generate an identifier of a container.

In the embodiments of the present invention, the container is a segment of structured data.

As an embodiment of the present invention, the container may be stored as a file, or a database, or the like.

The container data packet generating unit 53 is configured to combine the content data packet generated by the content data packet generating unit 51 and the identifier generated by the container identifier generating unit 52 into a container data packet capable of encapsulating value-added content information.

In the embodiments of the present invention, the content data packet and the container ID are combined into the container data packet, and the value-added content information may be encapsulated into the container data packet.

As a preferred embodiment of the present invention, the value-added content information may be payment prompt information of the content or advertisement content data.

As an embodiment of the present invention, the value-added content information may be encapsulated into the container data packet before or after the content propagation.

The resource address generating unit 54 is configured to generate a resource address comprising the identifier generated by the container identifier generating unit 52.

In the embodiments of the present invention, since the resource address comprises the container ID, upon receiving a request for opening the resource address, the resource propagation system may acquire the content and the value-added content information by query via the container ID.

In the embodiments of the present invention, the apparatus 50 for assembling data further comprises a data encapsulating unit 55, configured to encapsulate the value-added content information in the container data packet.

As an embodiment of the present invention, the data encapsulating unit 55 comprises: a data fusing module 551, an address generating module 552, and an address replacing module 553.

The data fusing module 551 is configured to import the value-added content information into content to generate a fusion file.

The address generating module 552 is configured to generate a resource address of the fusion file.

The address replacing module 553 is configured to replace the resource address comprised in the content data packet with the resource address of the fusion file.

As an embodiment of the present invention, the data encapsulating unit 55 further comprises: a resource address acquiring module 554, a presence parameter acquiring module 555, and a value-added content information writing module 556.

The resource address acquiring module 554 is configured to acquire a resource address of the value-added content information.

The presence parameter acquiring module 555 is configured to acquire a presence parameter of the value-added content information.

The value-added content information writing module 556 is configured to write the resource address acquired by the resource address acquiring module 554 and the presence parameter acquired by the presence parameter acquiring module 555 into the container data packet.

According to the embodiments of the present invention, by acquiring content, and generating a content data packet, generating an identifier of a container, combining the content data packet and the container identifier into a container data packet capable of encapsulating value-added content information, and generating a resource address comprising the container identifier, value-added content information may be conveniently encapsulated into content as required.

It should be noted that, during assembling content and value-added content information performed by the apparatus for assembling data according to the above embodiment, the apparatus is described by only using division of the above functional modules as an example. In practice, the functions may be assigned to different functional modules for implementation as required. To be specific, the resource propagation system is divided into different functional modules in terms of internal structure to implement all or part of the above-described functions. In addition, the apparatus for assembling data according to the above embodiment is based on the same inventive concept as the method for assembling data according to the embodiment of the present invention. The specific implementation is elaborated in the method embodiments, which is not be detailed herein any further.

Figure 6:
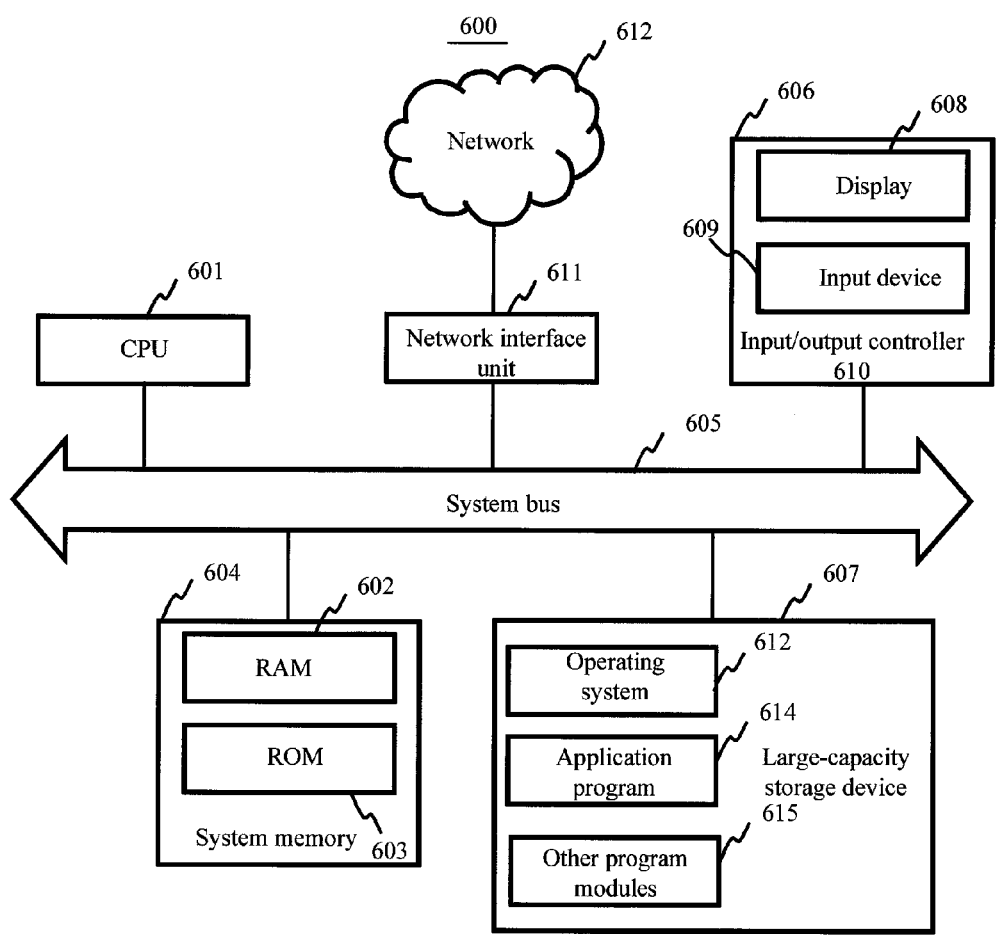
FIG. 6 is a schematic structural view of a server according to an embodiment of the present invention.

FIG. 6 is a schematic structural view of a server according to an embodiment of the present invention.

The value-added content information server 140 and the resource propagation server 160 may both employ the structure illustrated in FIG. 6, to implement the method for assembling data.

A server 600 comprises a central processing unit (CPU) 601, a system memory 604 comprising a random access memory (RAM) 602 and a read-only memory (ROM) 603, and a system bus 605 communicatively connecting the system memory 604 and the CPU 601. The server 600 further comprises a basic input/output system (BIOS) 606 for facilitating information transmission between various components within a computer, and a large-capacity storage device 607 for storing an operating system 613, an application program 614, and one or more other program modules 615.

The BIOS 606 comprises a display 608 for displaying information, and an input device 609 such as a mouse and a keyboard, for information input by a user. The display 608 and the input device 609 are both communicatively connected to the CPU 601 via an input/output (I/O) controller 610 communicatively connected to the system bus 605. The BIOS 606 may further comprise the I/O controller 610 to receive and process inputs from such devices as a keyboard, a mouse, or an electronic stylus touch pen. Analogously, the I/O controller 610 further provides outputs to a display screen, a printer, or another type of output device.

The large-capacity storage device 607 is communicatively connected to the CPU 601 via a large-capacity storage controller (not illustrated in FIG. 6) communicatively connected to the system bus 605. The large-capacity storage device 607 and the non-transitory computer-readable storage medium associated therewith provide non-volatile storage for the server 600. To be specific, the large-capacity storage device 607 may include a non-transitory compute-readable storage medium (not illustrated in FIG. 6), for example, a hard disk or a CD-ROM driver.

Without loss of generality, the non-transitory computer-readable storage medium may comprise a computer storage medium and a communication media. The computer storage medium comprises volatile and non-volatile, movable and unmovable media that are implemented using any method and technology for storing information such as computer-readable instructions, data structures, program modules, or other data. The non-transitory computer-readable medium includes a RAM, a ROM, an EPROM, an EEPROM, a flash memory, or another such solid storage technology-based storage device; a CD-ROM, a DVD, or another such optical storage device; and a data cartridge, a magnetic card, a magnetic tape, or another such magnetic storage device. Nevertheless, a person skilled in the art may know that the non-transitory computer-readable storage medium is not limited to what are listed above. The system memory 604 and the large-capacity storage device 607 may be uniformly referred to as a memory.

According to the embodiments of the present invention, the server 600 may be further communicatively connected to a remote computer on the network by using a network such as the Internet, and may run on the computer. To be specific, the server 600 may be communicatively connected to a network 612 via a network interface unit 611 communicatively connected to the system bus 605, or the server 600 may be communicatively connected to another type of network or a remote computer system (not illustrated in FIG. 6) via the network interface unit 611.

The memory further comprises at least one program. The at least one program is stored in the memory, and is configured to be performed by at least one central processing unit 601. The at least one program comprises instructions for performing the method for assembling data as illustrated in FIG. 2, FIG. 3, or FIG. 4.

The server according to this embodiment may be a resource propagation server or a value-added content information server, or may be one server where both a resource propagation server and a value-added content information server are integrated. According to the embodiments of the present invention, the resource propagation server acquires content and generates a content data packet, generates an identifier of a container, combines the content data packet and the container identifier into a container data packet capable of encapsulating value-added content information, and generates a resource address comprising the identifier. In this way, value-added content information, such as advertisement content data stored on the value-added content information server, may be conveniently encapsulated into content as required. The present invention solves the problem, in the prior art, that in conventional advertisement acquisition manners, expression of the advertisement is monotonous, and after the advertisement is released to a content website or a client, advertisement content cannot be replaced at any time as the advertiser requires, but the operations for advertisement content replacement are complicated and replacement costs are high. In addition, compared with the conventional advertisement acquisition manners, the embodiments of the present invention encapsulate such value-added content information as advertisement content data together via a container, implement decoupling between the content and the value-added content information. In this way, the value-added content information may be conveniently replaced, replacement costs of such value-added content information as the advertisement content data are reduced, and matchability between the content and the value-added content information is greatly enhanced.

Persons of ordinary skill in the art should understand that all or part of steps of the methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

The content and the value-added content information are encapsulated via a container according to an embodiment of the present invention, which implements decoupling between the content and the value-added content information, implements simple change between the content and the value-added content information, reduces change cost of the value-added content information, such as, advertisement content data, and better matches the content and the value-added content information.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. In a system for displaying data to a client terminal device that includes content from a resource propagation server and value-added content from a value-added content information server encapsulated in the content, a method for assembling data, comprising:
   acquiring content, and generating a content data packet at the resource propagation server;
   generating an identifier of a container;
   combining the content data packet and the identifier into a container data packet;
   encapsulating value-added content information from the value-added content information server into the container data packet; and
   generating a resource address comprising the identifier;

wherein the container is structured data, and the field of the value-added content information comprises a resource address and a presence parameter of the value added information;

wherein encapsulating value-added content information into the container data packet comprises the steps of:

acquiring the resource address of the value-added content information;

acquiring the presence parameter of the value-added content information;

importing the value-added content information into the content to generate a fusion file;

generating a resource address of the fusion file;

writing the resource address and the presence parameter of the value-added content information into the container data packet; and replacing the resource address in the content data packet with the resource address of the fusion file; and changing a manner of presentation of the value-added content information to the client terminal device by updating data in the container data packet;

the method further comprising:

segmenting the content and generating resource addresses of segments of the content when the content is imported by a content propagator into the resource propagation server; and wherein writing the resource address and the presence parameter of the value-added content information into the container data packet specifically comprises:

combining the resource address and the presence parameter of the value-added content information, and the resource addresses of the segments of the content into a play list, and the play list is the fusion file generated by importing the value-added content information into the content; and whereby the content and value-added content information are decoupled, permitting simple and convenient replacement of the value-added content information in the display to the client terminal device.

2. The method according to claim 1, wherein when the content is acquired via the resource address, the content data packet comprises resource address, content name, content type, and content attribute.

3. The method according to claim 1, wherein when the content is acquired by uploading a file, the content data packet comprises a resource address of the file.

4. The method according to claim 1, wherein the structured data is stored as a file or a database.

5. The method according to claim 1, wherein the value-added content information is payment prompt information of the content or advertisement content data.

6. The method according to claim 1, wherein changing a manner of presentation of the value-added content information by updating data in the container data packet specifically comprises: changing a manner of presentation of the value-added content information by updating the presence parameter of the field of the value added content information in the play list.

7. An apparatus for assembling data comprising a RAM and a central processing unit, the central processing unit being configured to execute programs stored in the RAM in the form of software modules, wherein:

a content data packet generating module executed by the processing unit to acquire content from a resource propagation server, and generate a content data packet;

a container identifier generating module executed by the processing unit to generate an identifier of a container;

a container data packet generating module executed by the processing unit to combine the content data packet and the identifier into a container data packet;

a data encapsulating module executed by the processing unit to acquire value-added content information from a value-added content information server and to encapsulate the value-added content information into the container data packet; and a resource address generating module executed by the processing unit to generate a resource address comprising the identifier;

wherein the container is structured data, and the field of the value-added content information comprises a resource address and a presence parameter of the value added information; and wherein the encapsulating unit value-added content information module comprises:

a resource address acquiring module executed by the processing unit to acquire a resource address of the value-added content information;

a presence parameter acquiring module executed by the processing unit to acquire a presence parameter of the value-added content information;

a data fusing module executed by the processing unit to import the value-added content information into content to generate a fusion file;

an address generating module executed by the processing unit to generate a resource address of the fusion file;

a value-added content information writing module executed by the processing unit to write the resource address and the presence parameter into the container data packet;

an address replacing module executed by the processing unit to replace the resource address comprised in the content data packet with the resource address of the fusion file;

a change module executed by the processing unit to change a manner of presentation of the value-added content information to a client terminal device by updating data in the container data packet; and whereby the content and value-added content information are decoupled, permitting simple and convenient replacement of the value-added content information in the display to the client terminal device.

8. The apparatus according to claim 7, wherein when the content is acquired via the resource address, and the content data packet comprises resource address, content name, content type, and content attribute.

9. The apparatus according to claim 7, wherein when the content is acquired by uploading a file, the content data packet comprises a resource address of the file.

10. The apparatus according to claim 7, wherein the structured data is stored as a file or a database.

11. The apparatus according to claim 7, wherein the value-added content information is payment prompt information of the content or advertisement content data.

12. A resource propagation system, comprising: an apparatus for assembling data, wherein the apparatus for assembling data comprises a RAM and a central processing unit, the central processing unit being configured to execute programs stored in the RAM in the form of software modules, wherein:

a content data packet generating module executed by the processing unit to acquire content from a resource propagation server, and generate a content data packet;
a container identifier generating module executed by the processing unit to generate an identifier of a container;
a container data packet generating module executed by the processing unit to combine the content data packet and the identifier into a container data packet;
a data encapsulating module executed by the processing unit to acquire value-added content information from a value-added content information server and encapsulate the value-added content information into the container data packet; and
a resource address generating module executed by the processing unit to generate a resource address comprising the identifier;
wherein the container is structured data, and the field of the value-added content information comprises a resource address and a presence parameter of the value added information; and
wherein the data encapsulating module comprises:
   a resource address acquiring module executed by the processing unit to acquire a resource address of the value-added content information;
   a presence parameter acquiring module executed by the processing unit to acquire a presence parameter of the value-added content information;
   a data fusing module executed by the processing unit to import the value-added content information into content to generate a fusion file;
   an address generating module executed by the processing unit to generate a resource address of the fusion file;
   a value-added content information writing module executed by the processing unit to write the resource address and the presence parameter into the container data packet;
   an address replacing module executed by the processing unit to replace the resource address comprised in the content data packet with the resource address of the fusion file;
   a change module executed by the processing unit to change a manner of presentation of the value-added content information by updating data in the container data packet; and
   whereby the content and value-added content information are decoupled, permitting simple and convenient replacement of the value-added content information in the display to the client terminal device.

13. The system according to claim 12, wherein when the content is acquired via the resource address, the content data packet comprises resource address, content name, content type, and content attribute.

14. The system according to claim 12, wherein when the content is acquired by uploading a file, the content data packet comprises a resource address of the file.

15. The system according to claim 12, wherein the structured data is stored as a file or a database.

16. The system according to claim 12, wherein the value-added content information is payment prompt information of the content or advertising content data.

* * * * *